March 6, 1928.
C. M. CLAY
1,661,923
ROTARY RECTIFIER
Filed June 2, 1923
6 Sheets-Sheet 1
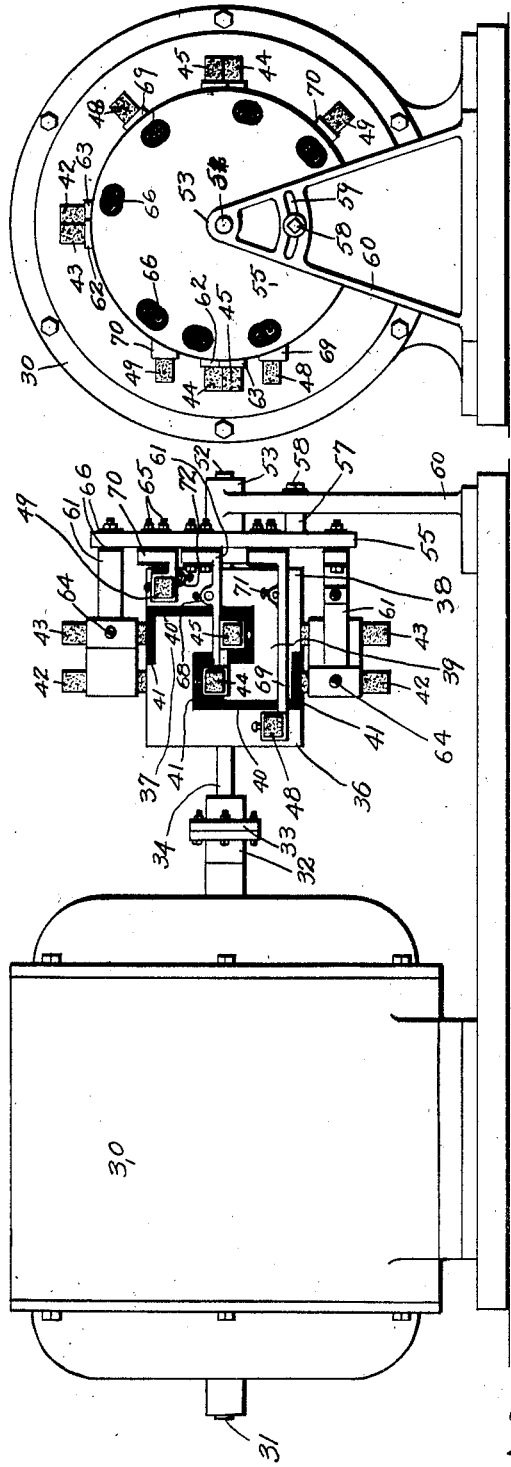
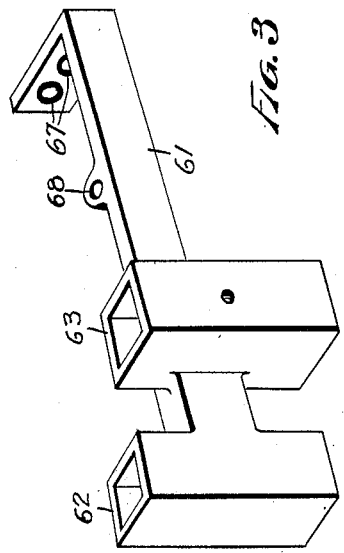
INVENTOR
CASSIUS M. CLAY
BY Edward E Longan
ATTY.

March 6, 1928.

C. M. CLAY 1,661,923

ROTARY RECTIFIER

Filed June 2, 1923

INVENTOR
CASSIUS M. CLAY
BY Edward E. Longan
ATTY.

March 6, 1928. 1,661,923

C. M. CLAY

ROTARY RECTIFIER

Filed June 2, 1923    6 Sheets-Sheet 3

INVENTOR
CASSIUS M. CLAY
BY Edward E. Longan
ATTY.

March 6, 1928.
C. M. CLAY
1,661,923
ROTARY RECTIFIER
Filed June 2, 1923
6 Sheets-Sheet 4
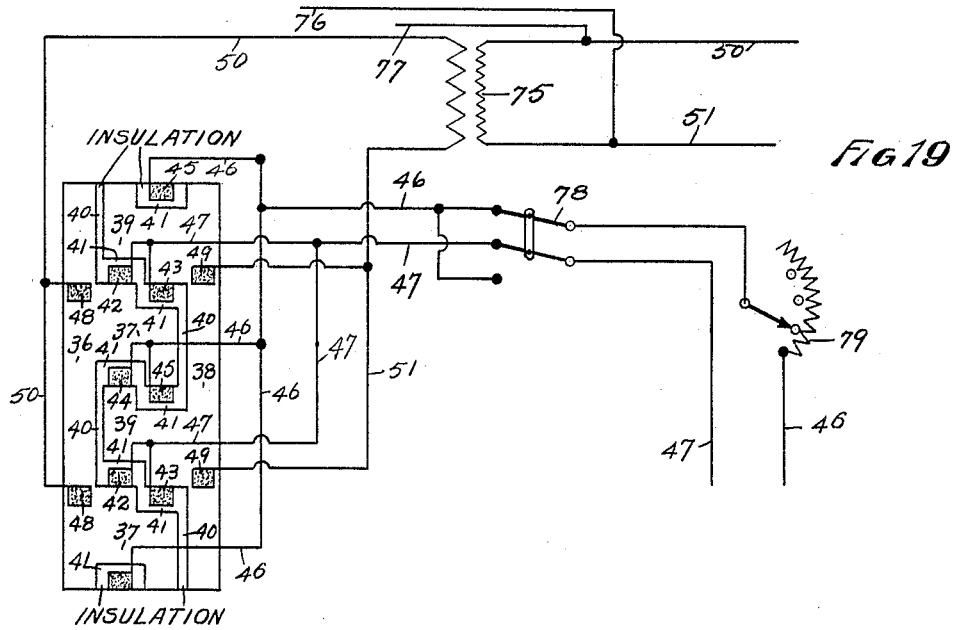
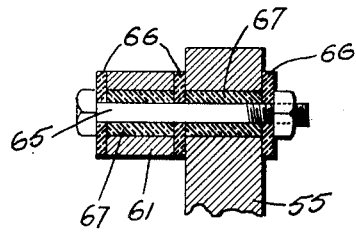
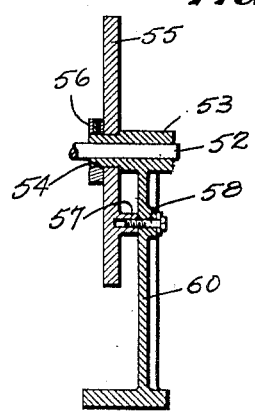
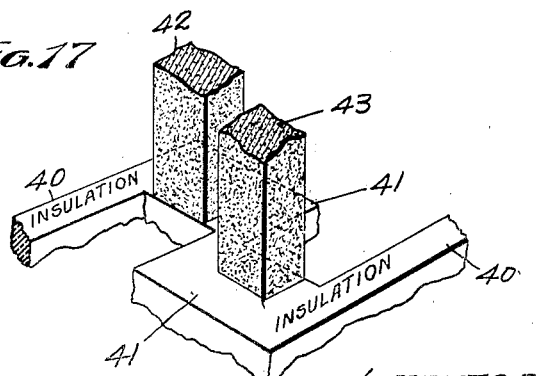
INVENTOR
CASSIUS M. CLAY March 6, 1928.

C. M. CLAY 1,661,923

ROTARY RECTIFIER

Filed June 2, 1923

INVENTOR
CASSIUS M. CLAY
BY Edward E. Longan
ATTY.

March 6, 1928.
C. M. CLAY
1,661,923
ROTARY RECTIFIER
Filed June 2, 1923    6 Sheets-Sheet 6
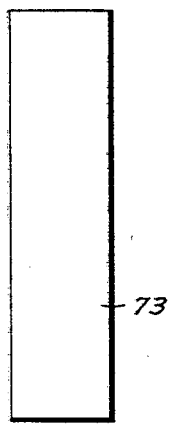
FIG.20
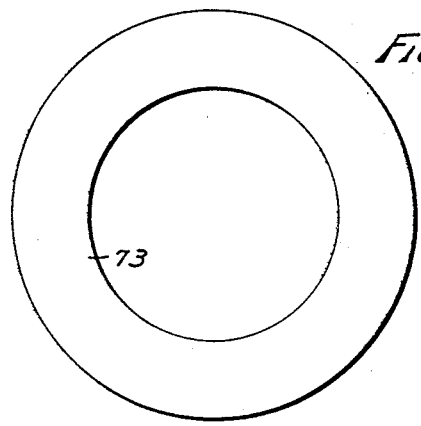
FIG.21
FIG.23
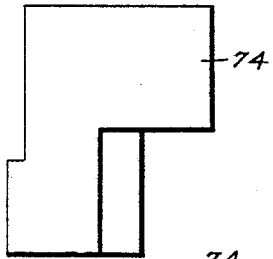
FIG.25
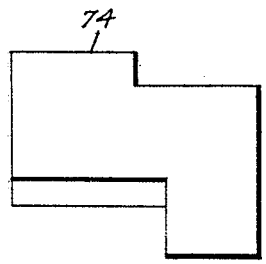
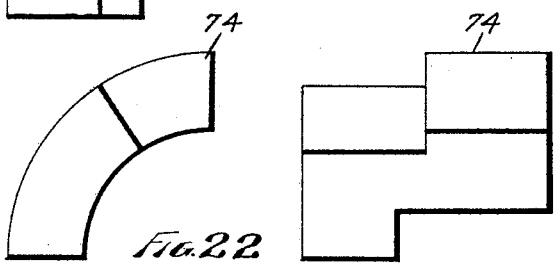
FIG.26
FIG.22
FIG.24
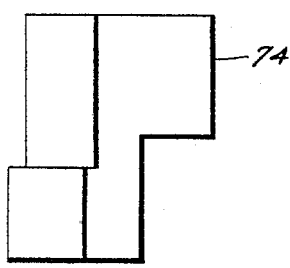
INVENTOR
CASSIUS M. CLAY
BY Edward E Logan
ATTY.

Patented Mar. 6, 1928.

1,661,923

UNITED STATES PATENT OFFICE.

CASSIUS M. CLAY, OF MEXICO, MISSOURI

ROTARY RECTIFIER.

Application filed June 2, 1923. Serial No. 642,919.

My invention relates to improvements in rotary rectifiers and has for its primary object a rotary rectifier which is so constructed that there are absolutely no dead points or short circuit points which cause an interrupted direct current and a consequent loss of power.

A further object is to construct a rotary rectifier by means of which an alternating current is converted into a direct current and which is so arranged that the direct current may be delivered to the translating device at any desired voltage and amperage.

A further object is to construct a rotary rectifier which is so arranged that when the positive current brushes break contact at the zero point of the cycle on one section of the commutator, they immediately make contact with the other section of the commutator picking up the positive current then flowing therethrough after such alternation at the zero point thus eliminating sparking and arcing at the brushes and enabling my device to be used on currents of heavy amperage.

In the drawings:—

Fig. 1 is a side elevation of my device;

Fig. 2 is an end view of the same;

Fig. 3 is an enlarged perspective view of one of the double brush holders employed;

Fig. 15 is an enlarged fragmental section of the disk employed for carrying and adjusting the brushes;

Fig. 16 is a vertical section of the commutator shaft bearing showing the brush carrying disk in position and the manner of securing the same in position;

Fig. 17 is an enlarged diagrammatic perspective view showing the position of two of the direct current brushes in their proper position on the insulation;

Fig. 19 is a diagrammatic view of the commutator showing the manner of making the electrical connections and the location of the transformer, pole changer and rheostat;

Fig. 20 is an enlarged side elevation of the rings made use of in the modified form of commutator;

Fig. 21 is an end view of the same;

Fig. 22 is an end elevation of one of the commutator sections used in the modified form;

Fig. 23 is a top plan view of the same;

Fig. 24 is a bottom plan view of the same;

Fig. 25 is an outside face view of the same and

Fig. 26 is an inside view of the same.

Figure 4:
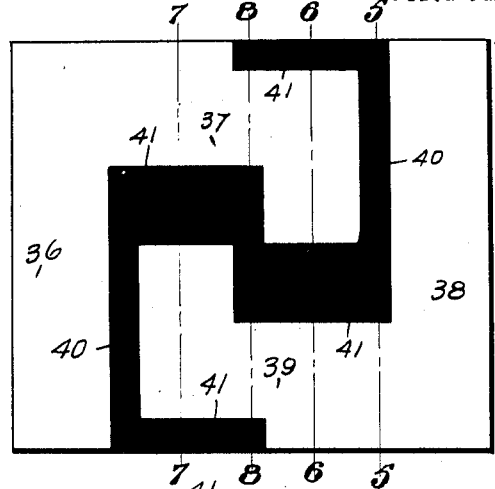
Fig. 4 is an enlarged elevation of the commutator in assembled form.
Figure 5:
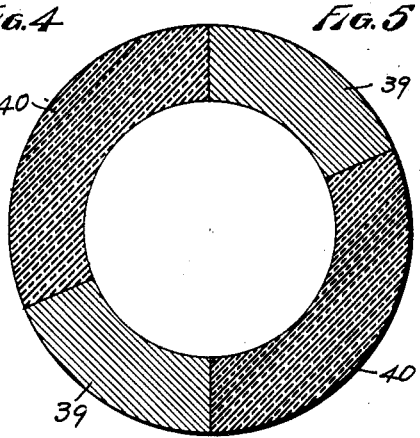
Fig. 5 is a cross section of the same taken on the line 5—5 of Fig. 4.
Figure 6:
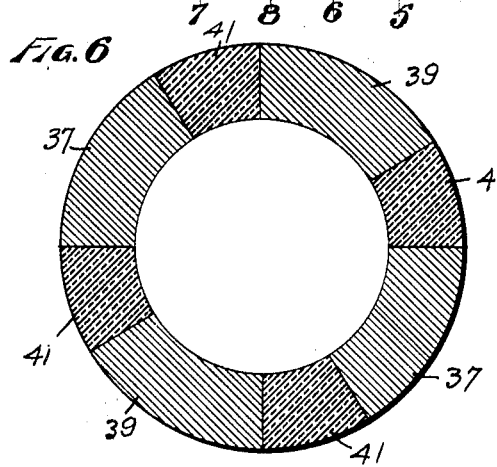
Fig. 6 is a cross section taken on the line 6—6 of Fig. 4.
Figure 7:
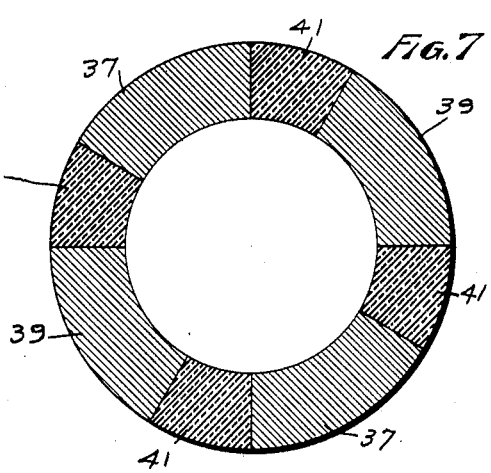
Fig. 7 is a cross section taken on the line 7—7 of Fig. 4.
Figure 8:
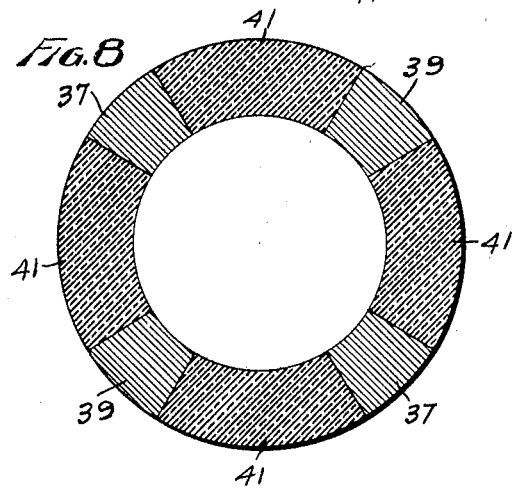
Fig. 8 is a cross section taken on the line 8—8 of Fig. 4.
Figure 9:
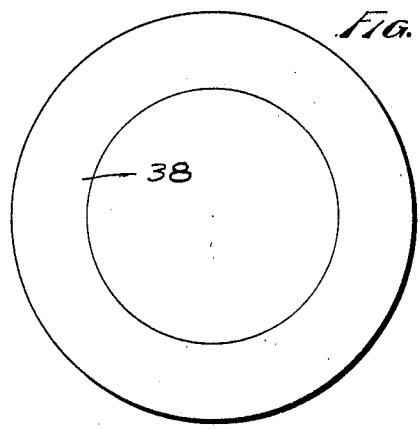
Fig. 9 is an end view of the commutator.
Figure 10:
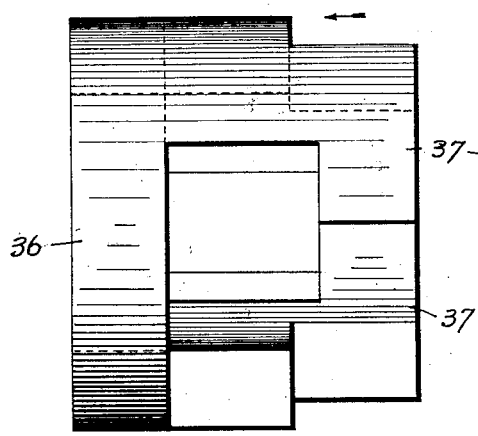
Fig. 10 is an enlarged side elevation of one of the commutator sections.
Figure 11:
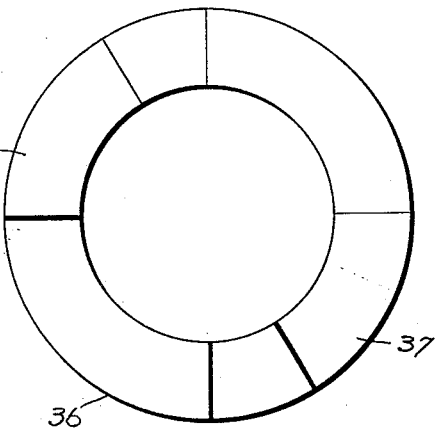
Fig. 11 is an end view of the same as indicated with the arrow in Fig. 10.
Figure 13:
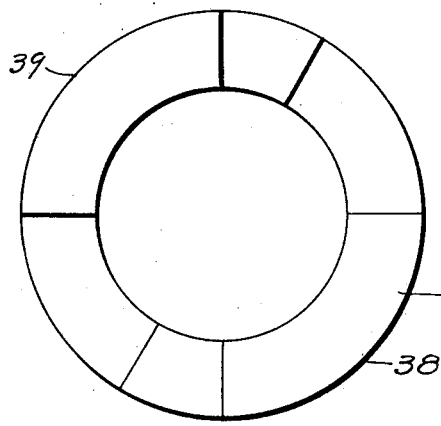
Fig. 13 is an end view taken as indicated by the arrow in Fig. 12.
Figure 12:
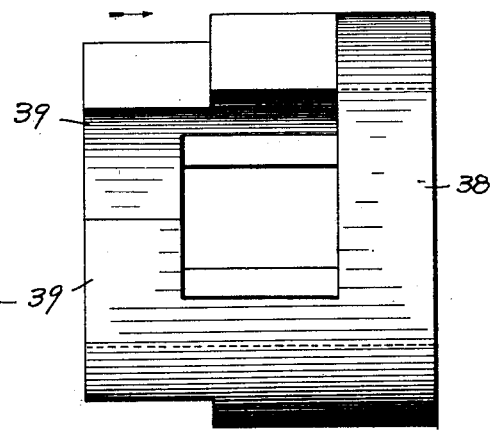
Fig. 12 is an enlarged side elevation of the other commutator section.
Figure 14:
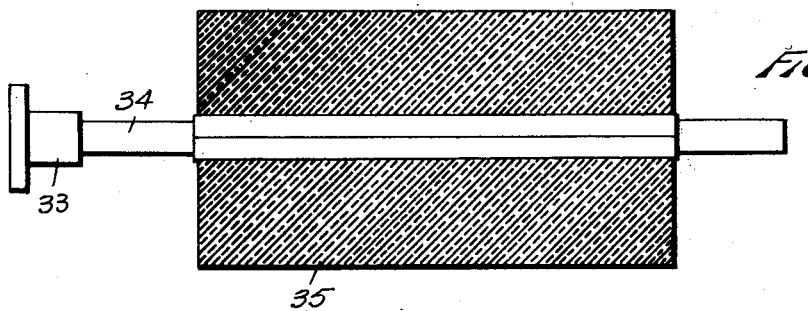
Fig. 14 is an enlarged view of the commutator shaft with the insulating core in position and in section.

In the construction of my device I employ a motor 30 which is of the synchronous type. This motor has attached to one end of its shaft 31, a portion 32 of a coupling. The other portion 33 of this coupling is secured to one end of a shaft 34. The shaft 34 has mounted thereon a core 35 which is composed of insulating material and on which the commutator, employed, is mounted. The commutator consists of two sections. One section comprises a ring 36 which has lateral projections 37. The other section is composed of a ring 38 having lateral projections 39. The projections 37 and 39 extend in opposite directions and when assembled on the core project toward the opposite section, but permit the insertion of insulating material 40. This insulating material is so formed as to have a plurality of laterally and circumferentially offset dead spots 41 which are wider than the width of the balance of the insulating material and over which brushes 42, 43, 44 and 45 are adapted to travel when the commutator is rotated by the motor. The brushes 44 and 45 will for convenience sake be termed positive brushes and are connected to the positive conductor 46 by means of suitable electric connections hereinafter to be explained. The brushes 42 and 43 are connected to the negative conductor 47 in a similar manner. Contacting with the ring 36 are brushes 48, and contacting with the ring 38 are brushes 49. These brushes are connected to the alternating current lines 50 and 51 respectively. The shaft 34 has its end 52 supported in a bearing 53. One end of this bearing is turned down as indicated by the numeral 54, and over the turned down portion is placed a rotatable disk 55. This disk is preferably held in position by means of a set collar 56. The disk 55 is provided with a screw threaded boss 57 which receives a screw 58. The screw 58 projects through a slot 59 formed in the bearing support 60. The purpose of this slot will be explained in detail later. Secured to the disk 55 are brush holders 61 which have formed thereon integral sleeves 62 and 63. These sleeves are offset from each other as illustrated in Figs. 1 and 3 and are for the purpose of receiving the brushes 42, 43, 44 and 45. These brushes are secured within the sleeve in any well known manner such as by means of screws 64 or other fastening means, in fact, any manner well known to the art may be employed for holding the brushes within the supports 61. The brush holders are secured to the disk 55 by means of bolts 65 which are insulated from the disk 55 and brush holders 61 by means of insulating plates 66 and insulating sleeves 67 so that there will be no possibility of any electric current reaching the disk 55. The brush holders are preferably provided with sockets 68 into which the ends of the positive and negative conductors 46 and 47 can be inserted. In this manner the current picked up by the respective brushes will be delivered to the proper conductors. Secured to the disk 55 are brush holders 69 and 70. These brush holders carry the brushes 48 and 49 respectively. The brush holders 69 and 70 are provided with sockets 71 and 72 to receive the alternating current conductors 50 and 51 respectively.

Figure 18:
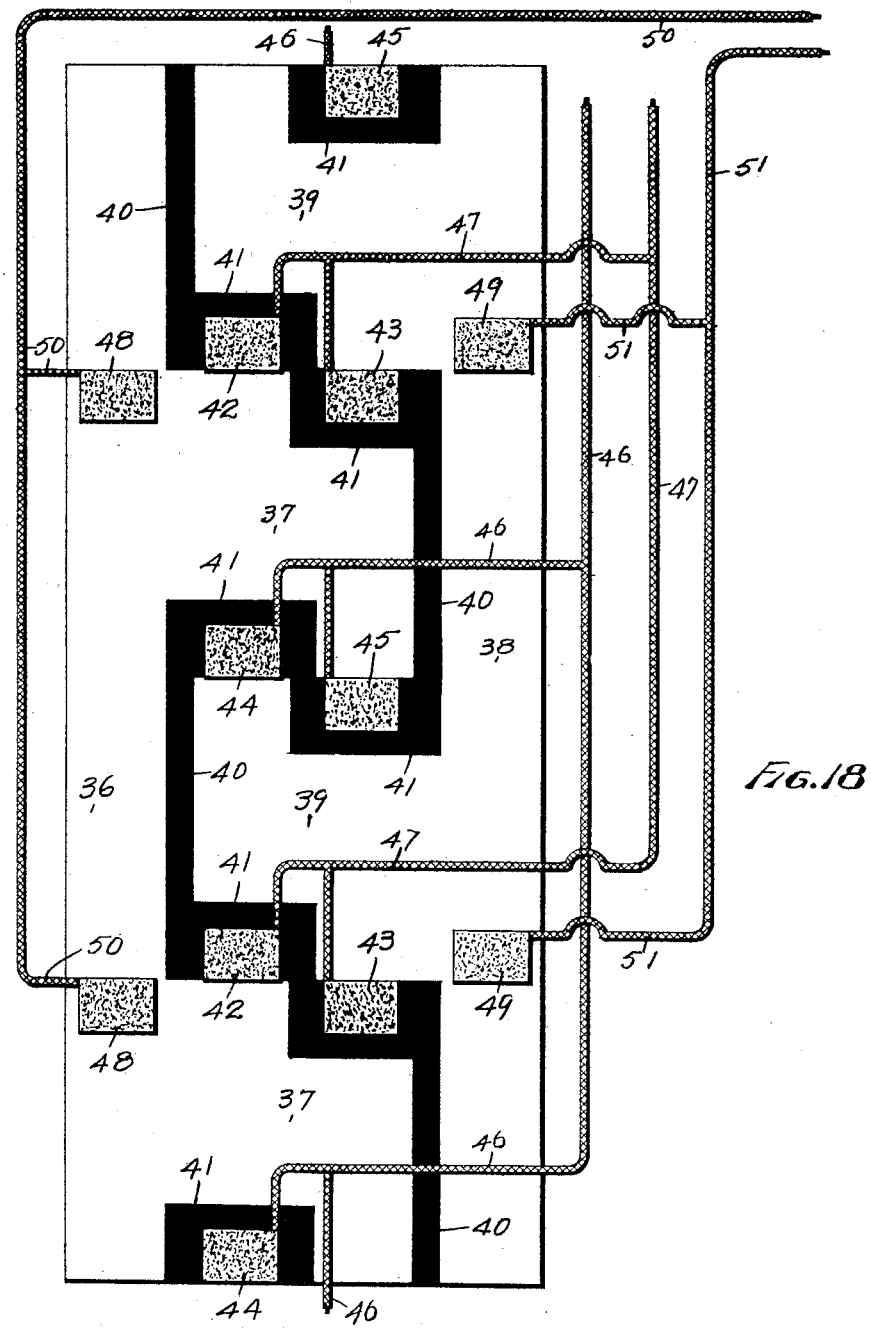
Fig. 18 is an enlarged plan of the commutator laid out flat with the position of the brushes and the conductor connections illustrated.

In Figs. 20 to 26 inclusive, I have shown a modified construction of commutator in which a pair of rings 73 are employed which take the place of the ring portions 36 and 37. These are mounted on each end of the insulating core 35. Secured to the core between the rings 73 are sections 74 which are so placed as to contact with the rings alternately and when assembled, form a commutator as illustrated in Figs. 1, 4 and 18. This method of constructing the commutator however, is not as desirable as forming the same in two sections, as previously described, on account of the great difficulty in getting the sections spaced and secured properly. In the construction previously described, it is possible to mill the sections and in this manner great accuracy can be obtained.

My device is assembled as follows:—

After the insulating core 35 has been properly secured on the shaft 34, the two sections of commutator are secured thereon from opposite ends. This may be either done by pressing the same in position or by making a sliding fit and pinning the sections thereto. However, in the latter case, it is essential that the pins do not contact with the shaft as this would cause a short circuit and render the device useless. After the two sections have been secured on the core, the spaces between the adjacent edges of the sections are filled with insulating material, as illustrated in Figs. 1, 4 and 18 after which the commutator is turned down to proper size. The disk 55 is then placed over the bearing 53 and secured in position by the set collar 56, the brush arms having been previously secured thereto. The disk 55 is then rotated so as to permit the insertion of the screw 58 through the slot 59. The shaft 34 is then placed in the bearing 53 and the coupling secured, after which the various electrical connections are made.

It is to be noted from Figs. 1, 18 and 19 that the brushes 44 and 45 and 42 and 43 are so arranged as to have the rear face of one brush in alinement with the front face of the other brush. The purpose of this will be explained in the operation. After the electric connections have been made to the various brushes, a transformer 75 is placed in the alternating line. This transformer may be either of the ordinary type so as to give a fixed voltage or it may be adjustable so that the voltage can be varied. The transformer 75 however, is placed in the lines 50 and 51 between the lines 76 and 77 which lead to the motor and the commutator. In the direct voltage lines 46 and 47 is placed a pole changer 78, the purpose of which will be explained later, and also a rheostat 79 by means of which the amperage of the direct current can be regulated.

The operation of my device is as follows:—

After the electric current has been turned on the motor commences to rotate synchronously with the cycles of alternations. It being a well known fact that these alternations rise from what is called the zero point where there is no output of voltage or amperage, to a maximum point and to drop back again to zero after which the flow is reversed starting from zero and ending at zero, thus completing a complete cycle or a flow of negative and positive current. When the motor has been started, the disk 55 is so adjusted that the brushes 42, 43, 44 and 45 are on the dead spots 41 at the zero point of the alternation. That is, the brushes are not in contact with either the projections 37 or 39, one brush of each pair having just left one of the projections, the other brush of the pairs is just ready to enter on the adjacent projection of the opposite section. The brushes 48 and 49 however, are always in contact with the ring portions 36 and 38 of the respective sections. For example, we will presume that the commutator is revolving in the direction indicated by the arrow in Fig. 18 and the positive half of the cycle is coming over the conductor 50. This will leave the conductor 51 with a negative cycle. The positive cycle is now delivered to the ring 36 and to the projections 37, while the negative cycle passes through the ring 38 and projections 39. The brushes 42, 43, 44 and 45 being on the dead points at the zero point of the cycle, deliver no current. Now the slightest movement of the commutator brings the brushes 42 on to the projections 37 where they pick up the positive current and deliver it to the conductor 47 while at the same instant the brushes 44 come in contact with the projections 39 and deliver the negative current to the conductor 46. After the commutator has revolved a slight distance, the brushes 43 also enter on to the projections 37 and the brushes 45 on to the projections 39. Two brushes are now delivering current to the respective positive and negative conductors. This continues until the brushes 42 and 44 enter on to the dead spots 41 in their path after which only the brushes 43 and 45 continue to deliver current to the respective conductors. These brushes continue to deliver current until the last portion thereof leaves contact with the respective projections of the commutator on which they bear. At the instant these brushes come on the dead spot, the half cycle has reached the zero point. In the last half cycle the current is reversed through the brushes 48 and 49, the brushes 48 delivering the negative portion and the brushes 49 the positive portion of the current. At this instant the commutator has rotated sufficiently to bring the brushes 42 on to the projections 39 of the commutator section 38, while the brushes 44 now enter on the projections 37 of the commutator section 36, thus continuing to carry negative current while the brushes 42 pick up the positive current from the other side. In a short time the brushes 43 and 45 will also come into action.

It will be noted from the foregoing description that the purpose of the offset of the brushes or rather the assembling of the brushes in offset pairs which are connected to the same line, is that as soon as the last brush leaves that projection of the commutator with which they have been in contact, the first brush is ready to enter the projection of the opposite section of the commutator. This, by means of the adjustment is done at the absolute zero point and there is no overlapping with a consequent short circuit causing a loss of power nor is there any appreciable space of time between the two, which would be the case were only one brush used, thus causing an irregular or jerky flow of current.

Of course, it is to be understood that it is not possible to always start the motor on the same cycle and for this reason, the pole changer 78 is employed so that the electric current can always be sent in the same direction to its point of delivery. This is especially essential in charging storage batteries where it is essential that the positive current flow in at one certain terminal and the negative flow out at the other, and also in the use of arc lights where it is preferable to have the crater formed in the upper carbon all the time to get the maximum efficiency of light.

With the use of the transformer 75, the voltage of the current can be regulated or fixed to meet certain requirements while the rheostat 79 may be used to regulate the amperage when required. This rheostat consumes very little current as the voltage of the current is brought to the desired point by the transformer mentioned and the amperage under such conditions requires very little regulation. In connection with the rheostat, I may, if desired, use an ammeter, this however, is not essential and therefore is not shown.

It is also possible by mounting two or more commutators on the same shaft and having separate brushes for each commutator to obtain direct current of various voltages. This is especially desirable in the charging of storage batteries, because batteries of six, twelve and higher voltage can all be charged at the same time and with the same machine and in approximately the same number of hours. This is practically impossible with battery chargers of the present type.

My device is also especially applicable to use in motion picture houses because of its great economy in operation in the conversion of current, its unlimited capacity, and the device does not occupy a great amount of space, has an extreme long life and is practically noiseless. In fact in the larger picture houses, rectifiers weighing thousands of pounds are employed and have to be installed in sound proof rooms to prevent disturbing the audience, while the smaller houses make use of the mercury arc rectifier which burns out in about eight hundred hours of service, both forms of conversion are very expensive and consume a large amount of current in their operation which is absolutely waste as this current is consumed within the apparatus itself and never reaches the point of destination, that is, the arc lamp, etc. My device is small enough and light enough to be readily transported from place to place.

My device, due to its peculiar construction and arrangement of brushes, opens up a new field for rectifiers. It is well known that a rectifier is much more efficient and economical in operation than a converter or motor-generator. Heretofore all rectifiers, while breaking contact with one side of the alternating current at the zero point of the cycle, did not make contact with the other side of the alternating current at the zero point of the cycle. Therefore there was excessive sparking and arcing of current between the brushes and commutator, and it was possible to rectify currents only of very small amperages. With my machine, due to the offset arrangement of the brushes of each pair, there is no sparking or arcing at the brushes, as they leave that section of the commutator connected to one side of the alternating current at the zero point of the cycle, and make contact with that section of the commutator connected to the other side of the alternating current at the zero point of the cycle. Therefore heavy amperages can be carried. In fact the capacity of the machine is limited only by the size of the brushes. This makes my device especially useful for arc lamps of motion picture machines and for large battery charging stations where heretofore rectifiers could not be used owing to the disadvantages above mentioned.

This machine is particularly desirable and advantageous for charging storage batteries, because the voltage of the direct current delivered to the batteries remains constant irrespective of the amperage drawn by the batteries, consequently the batteries are charged at a constant potential which is not only necessary to perfect charging but also prevents any overcharge of the batteries no matter how long the current is left turned on.

Having fully described my invention what I claim is:—

1. A rotary rectifier comprising a commutator formed of two ring sections having circumferentially extending projections, insulating material located between said sections and projections, the insulating material being circumferentially widened at the adjacent edges of said projections, brushes contacting with said ring sections for delivering an alternating electric current thereto, a plurality of brushes adapted to make and break contact consecutively with said projections at the zero point of the alternation of said current for taking a direct current therefrom, said last mentioned brushes being of less thickness than the circumferential width of the insulation between said projections, and means for rotating said commutator synchronously with the cycles of the alternating current.

2. A rotary rectifier comprising a commutator formed of two ring sections having circumferentially extending projections, insulating material located between said sections and projections, the insulation being circumferentially widened at said projections, brushes contacting with said ring sections for delivering an alternating current thereto, a plurality of brushes arranged in offset pairs, the combined circumferential width of said pairs being less than the circumferentially widened portions of the insulating material between adjacent portions adapted to make and break contact consecutively with alternate projections at the zero point of alternation of said current for taking off a positive current, and means for rotating said commutator synchronously with the cycles of the alternating current.

3. A rotary rectifier comprising a commutator formed of two ring sections having lateral and circumferential projections on either adjacent edges, insulating material located between said sections and projections, brushes contacting with said ring sections for delivering an alternating current thereto, a plurality of brushes adapted to consecutively make and break contact with alternate projections at the zero point of alternation for taking off a positive electric current, said brushes arranged to make contact with one projection at the same instant that contact with an adjacent projection is broken so that said brushes are continually in contact with a projection, means for adjusting said brushes on said commutator, and means for rotating said commutator synchronously with the cycles of the alternating current.

4. A rotary rectifier comprising an insulated commutator formed of two ring sections having lateral and circumferential projections on their adjacent edges, insulating material located between said sections and projections, brushes contacting with the ring sections for delivering an alternating current thereto, a plurality of brushes arranged in offset pairs, each of said pairs being so arranged that when one brush of said pair breaks contact with a projection, the other brush simultaneously makes contact with the next succeeding projection whereby said pairs are adapted to contact consecutively with alternate projections at the zero point of the current alternation for taking off a direct current therefrom, means for adjusting said brushes, and means for rotating said commutator synchronously with the cycles of the alternating current.

5. A rotary rectifier comprising a commutator composed of two sections having laterally and circumferentially extending offset portions on their adjacent edges and insulated from each other, the insulation having relatively wide laterally extending portions between the off-set portions, means for supplying alternating current to each of said sections, means for rotating said commutator synchronously with the cycles of the alternating current, and brushes arranged in pairs for taking off a direct current from said sections, said brushes so arranged as to make contact with one of said sections at the same instant that the contact with the other section is broken and at the zero point of alternation whereby any short circuiting or interruption of the direct current is prevented.

6. A rotary rectifier comprising a commutator formed of two ring sections mounted on a common axis and having projections on their adjacent edges, said projections so arranged as to lie in the same circular path of travel, insulating material located between said sections, the insulation between the lateral edges of the projections being wider than the material between the circumferentially extending edges of the ring sections, brushes contacting with the ring sections for delivering an alternating current thereto, a plurality of brushes arranged in offset pairs located in the path of travel of said projections, said brushes so arranged that one of said brushes of each pair will leave the projection of one of said sections at the same time that the other brush of the same pair enters the projection of the opposite section at the zero point of the cycle whereby arcing or interruption of the flow of the current through said brushes is eliminated, means for adjusting said brushes in a circular direction on said commutator, and means for rotating said commutator synchronously with the cycles of the alternating current.

7. In a rotary rectifier a commutator composed of a pair of laterally spaced rings provided with lateral and circumferential projections on their adjacent edges, the space between the adjacent circumferentially spaced edges of said projections being greater than the space between the adjacent lateral edges of the rings, a body of insulating material for filling in said spaces, brushes for supplying alternating electric current to said ring sections, off-set brushes having a combined circumferentially extending width less than the circumferential width of the insulating material and adapted to alternately pass over said off-set portions and the insulating material whereby a constant direct current can be taken off from said commutator and means for rotating said commutator in synchronism with said alternating current.

8. In a rotary rectifier a commutator composed of a pair of laterally spaced rings having projections extending laterally from their adjacent edges, circumferentially extending off-sets formed on the lateral projections of each ring, said off-sets having their adjacent lateral edges in lateral alignment, and insulating material located between the adjacent edges of said rings and projections, the width of the insulating material between the laterally extending edges being greater than the width between the circumferentially extending edges, brushes arranged in off-set pairs arranged in a line of travel of said lateral projections, the combined circumferential extension of said pairs of brushes being less than the width of the insulating material located between the edges of adjacent projections whereby each pair of brushes will constantly have one of said pairs in contact with a projection, and means for rotating said commutator in synchronism with the alternations of an alternating current.

9. A rotary rectifier comprising a commutator composed of spaced apart rings provided with laterally and circumferentially extending projections on their adjacent edges, said projections having their adjacent lateral edges circumferentially spaced apart and their ends laterally spaced from the adjacent ring, the space between said circumferentially spaced edges being greater than the space between the end and the adjacent ring, insulating material located in said spaces, a disk capable of rotary adjustment located adjacent one of said rings and concentric therewith, arms carried by said disk, brushes carried in pairs by said arms, said brushes being spaced apart longitudinally of the arm and one in advance of the other and arranged in the path of travel of said projections, said brushes being of less combined width than the insulation between the laterally extending edges of adjacent segments and so arranged that when one of said brushes leaves a projection, the other brush simultaneously contacts with an adjacent oncoming projection whereby an uninterrupted direct current can be taken off from said commutator, means for supplying an alternating current to each of said rings, and means for rotating said commutator in synchronism with the alternations of the last mentioned current.

10. A rotary rectifier comprising a commutator formed of two ring sections each having a continuous ring portion, axially extending projections on each of said ring portions, circumferentially offset portions on each of said projections, the offset portions of one ring being oppositely directed from those of the other ring and having their axial edges in perfect alignment, insulating material separating said sections and pairs of collector brushes circumferentially offset to align the forward edge of one brush with the rearward edge of the other, substantially as set forth.

11. A rotary rectifier comprising a commutator formed of two ring sections each having a continuous ring portion, axially extending projections on each of said ring portions, circumferentially offset portions each extending 90° of the circumference of said commutator on each of said projections, the offset portions of one ring being oppositely directed from those of the other ring and having their axial edges in perfect alignment, insulating material separating said sections and pairs of inter-connected collector brushes relatively narrower than said insulating material and circumferentially offset to align the forward edge of one brush with the rearward edge of the other to make and break contact with the respective segments simultaneously at the absolute zero point of the cycle, substantially as set forth.

In testimony whereof, I have signed my name to this specification.

CASSIUS M. CLAY.